J. L. McINTIRE.
WAGON BED AND HAY RACK.
APPLICATION FILED NOV. 14, 1908.
952,751.
Patented Mar. 22, 1910.
2 SHEETS—SHEET 2.
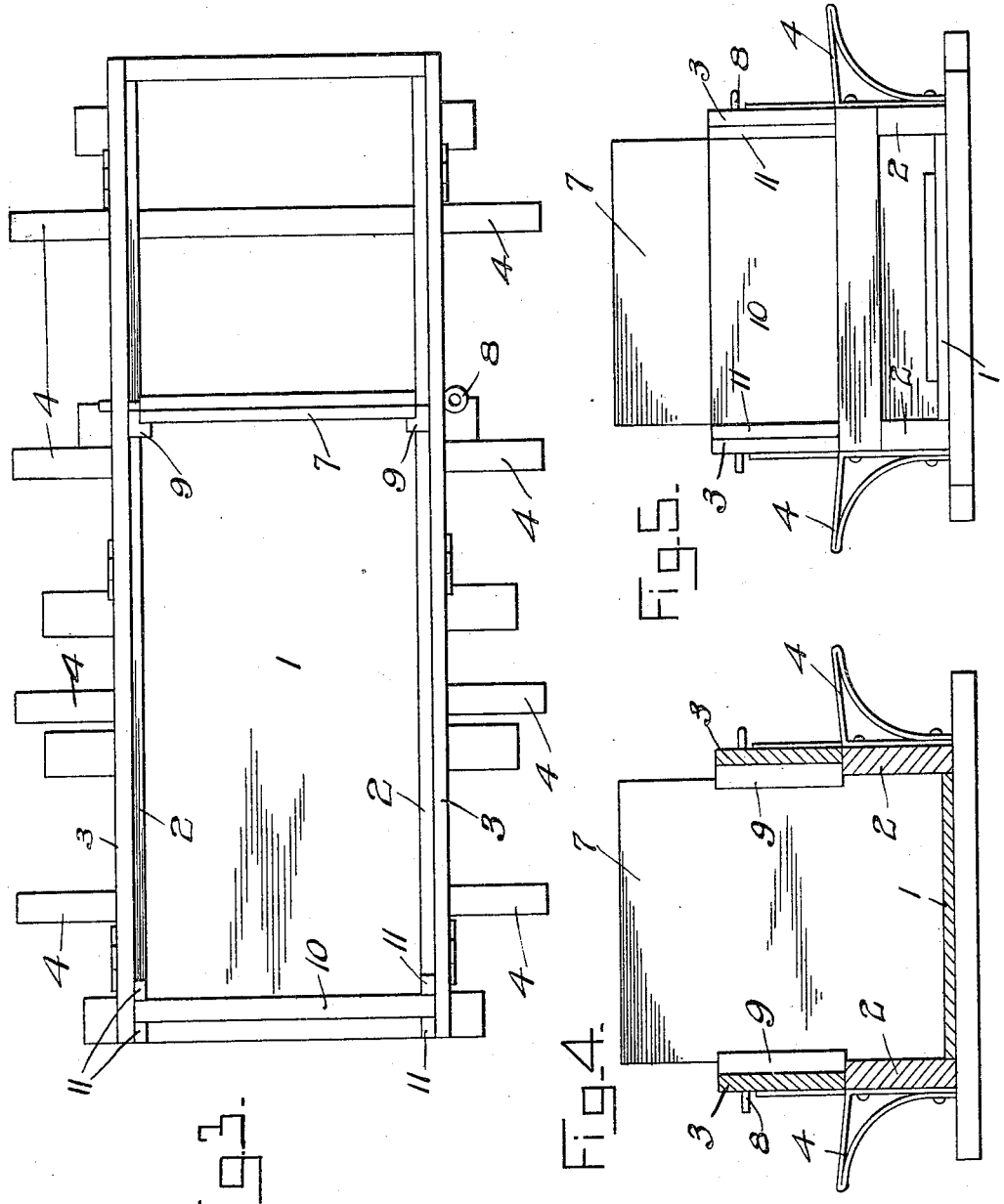
Witnesses
J. W. Miller.
M. DeGrange
Inventor
J. L. McIntire,
By D. Swift &C.
Attorneys

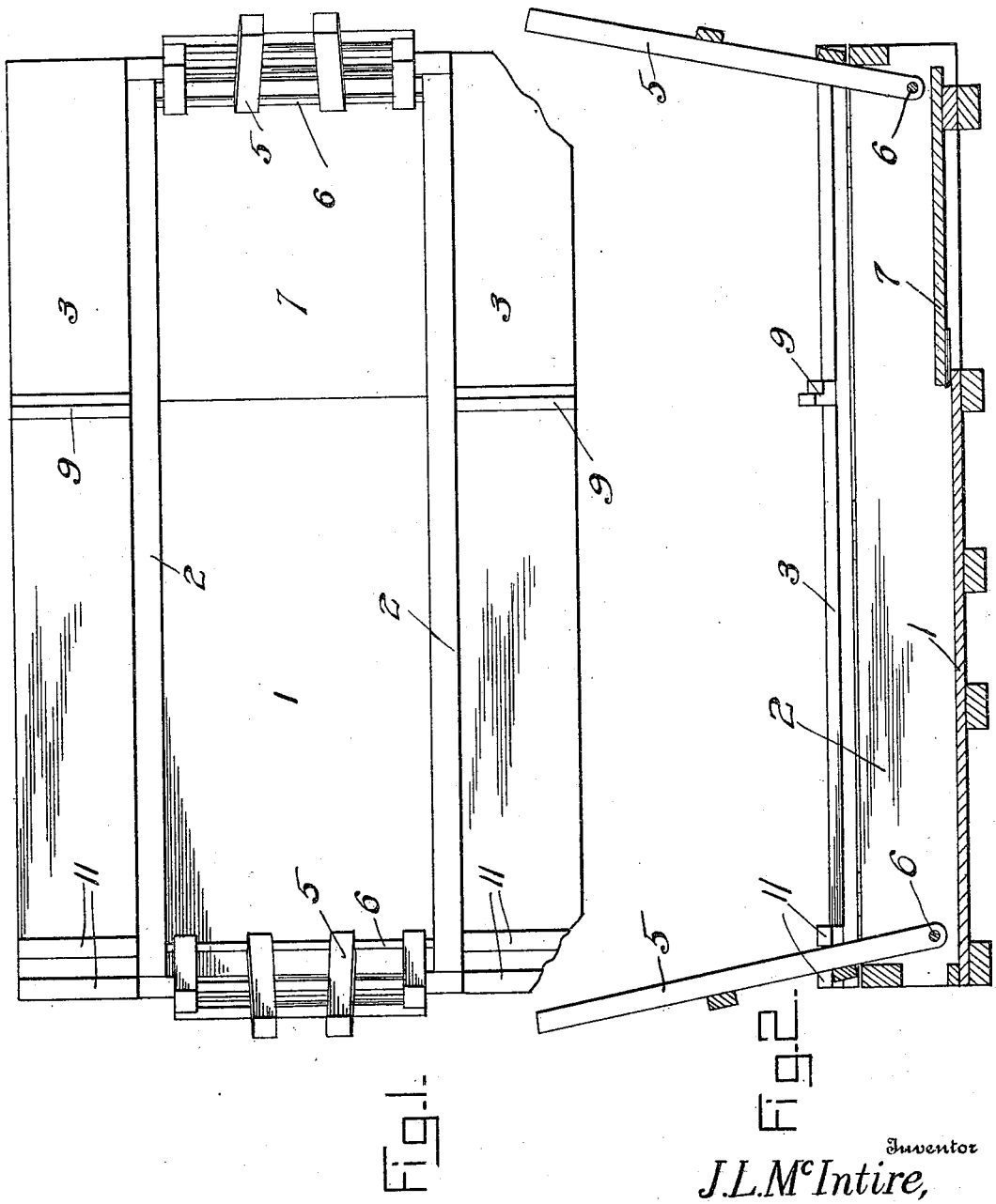

UNITED STATES PATENT OFFICE.

JOHN LESLIE McINTIRE, OF GEORGETOWN, KENTUCKY.

WAGON-BED AND HAY-RACK.

952,751.  Specification of Letters Patent.  Patented Mar. 22, 1910.

Application filed November 14, 1908. Serial No. 462,637.

*To all whom it may concern:*

Be it known that I, JOHN L. MCINTIRE, a citizen of the United States, residing at Georgetown, in the county of Scott and State of Kentucky, have invented a new and useful Wagon-Bed and Hay-Rack; and I do hereby declare the following to be a full, clear, and exact description of the invention, such as will enable others skilled in the art to which it appertains to make and use the same.

The invention relates to a combined wagon bed and hay rack and has for its object to provide an improved structure of this character adapted for the use of hauling all kinds of material.

The main object of the invention is to provide a device of this character of improved construction which can be readily used as a hay rack or wagon bed, and readily convertible into either.

In the drawings, Figure 1 is a plan view of the invention shown as a hay rack. Fig. 2 is a longitudinal sectional view. Fig. 3 is a top plan view showing the device used as a wagon bed or body. Fig. 4 is a transverse sectional view of the device. Fig. 5 is an end view.

Referring to the drawings, 1 designates the bottom of my device which is provided with rigid sides 2. Just above each of the rigid sides is a pivoted or hinged wing or member 3. The wings or members 3 when arranged in a horizontal plane are supported by L-shaped projections 4 connected with the sides 2. When the device is used as a hay rack, the ends 5 are pivotally mounted in the bed by means of pivot rods 6.

When it is desired to use the device for hauling grain or other heavy material, the rear door 7 which is hinged to the bottom 1 is arranged vertically and a rod 8 is inserted which holds the door in a vertical position. The door 7 is held against inward movement by means of L-shaped blocks 9 arranged vertically on the members 3. The front door 10 is held in position by means of a pair of rectangular blocks 11, connected with the sides 3.

It will be seen that my invention is especially adapted for the use of all farm wagons and that it is economical, simple, inexpensive and durable.

What is claimed is:

A wagon body having a bottom and rigid sides, hinged sides connected with the rigid sides, supports on the rigid sides adapted to support the hinged sides horizontally, removable ends pivoted to the body by transverse rods, a folding bottom section adapted to be supported vertically above the bottom, L-shaped stops on the hinged sides for the folding bottom section, and means for vertically supporting said folding bottom section.

In testimony whereof I have signed my name to this specification in the presence of two subscribing witnesses.

JOHN LESLIE McINTIRE.

Witnesses:
 JAMES BRADLEY,
 J. D. GROVER.